United States Patent [19]

Arps

[11] 3,813,485

[45] May 28, 1974

[54] SYSTEM FOR COMPRESSION OF DIGITAL DATA

[75] Inventor: Ronald Barthold Arps, Stanford, Calif.

[73] Assignee: International Business Machines Corporation, Armonk, N.Y.

[22] Filed: Jan. 5, 1972

[21] Appl. No.: 215,504

[52] U.S. Cl. ...... 178/6.8, 178/DIG. 3, 178/DIG. 22, 179/15.55 R, 340/347 DD

[51] Int. Cl. .............................................. H04n 7/12

[58] Field of Search ........................ 178/6.8, DIG. 3; 179/15.55 R; 340/347 DD

[56] References Cited

UNITED STATES PATENTS

| | | | |
|---|---|---|---|
| 2,732,424 | 1/1956 | Oliver | 179/15.55 R |
| 3,185,823 | 5/1965 | Ellersick, Jr. et al. | 340/347 DD |
| 3,185,824 | 5/1965 | Blasbalg et al. | 340/347 DD |
| 3,643,019 | 2/1972 | Beltz | 178/6.8 |

*Primary Examiner*—Howard W. Britton

[57] ABSTRACT

A system for compressing or compacting data that is representative of scanned images. Involved are predictive coding of two level pictorial data, followed by run-length coding characterized by an infinite overflow capability. The predictive stage utilizes an *n*th-order exhaustive, causal predictor which looks at adjacent points of previous lines and preceding points of present lines to predict what color (black or white) the predictive is. If the prediction is in error, a binary one is transmitted. Alternatively, if the prediction is correct, a binary zero is transmitted. The run-length coding is adapted to code the run-lengths of binary zero between binary one errors using a dual-base counting system, where $p$ represents one base (the number of low order subword states) and $n$ represents a second base (the number of high order subword states) with a subword length, $L$, of $\log_2 (p + n)$ bits. Mutually exclusive states in this run-length counting system provide an automatic comma for separating variable-length words (groups of subwords). A significant advantage of this type of run-length number system is that it provides a practical run-length encoding technique with the flexibility of variable-length overflow. The overall data compacting system also achieves a relatively high compression ratio for line drawings and other related type printed matter.

18 Claims, 9 Drawing Figures

PATENTED MAY 28 1974
3,813,485
SHEET 2 OF 5
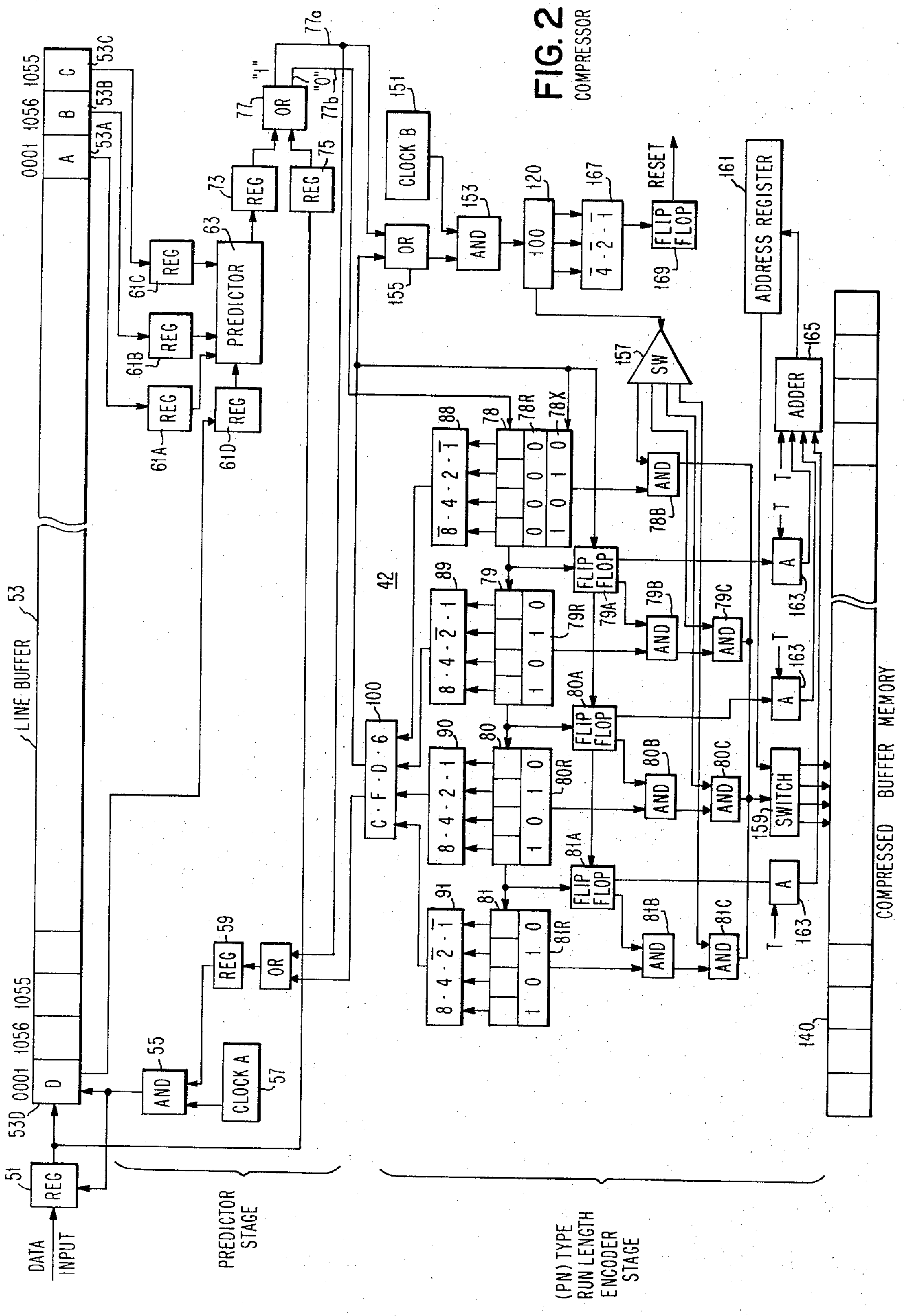
FIG. 2 COMPRESSOR

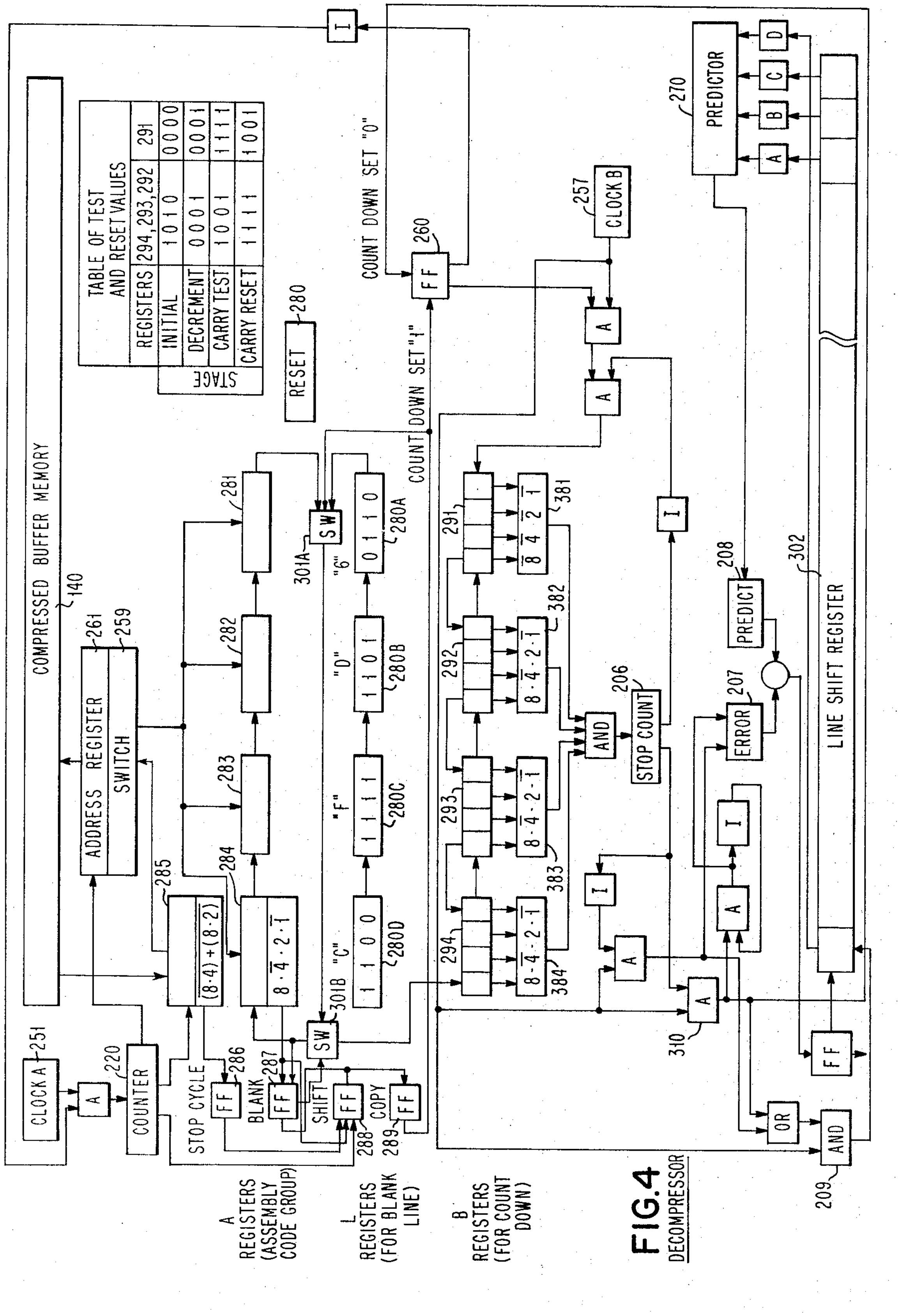
FIG.4 DECOMPRESSOR

SYSTEM FOR COMPRESSION OF DIGITAL DATA

BACKGROUND OF THE INVENTION

1. Field of the Invention

This invention relates to the compression of images or digital data representative of such images, and more particularly to a system for compacting digital data representative of images, for operation in conjunction with a computer.

2. Description of Prior Art

Data sources, such as video signals, facsimile transmission signals, etc., contain a substantial amount of redundancy. In view of this, source coding techniques, also called data compaction or compression, are sometimes used to efficiently encode the outputs of such data sources. Two obvious applications exist for these compaction methods. The first is in communications systems. Thus, by encoding the source, we can transmit the information over a communication channel in a relatively shorter period of time. Alternatively, a channel with smaller bandwidth could be utilized to transmit the coded data. The second application is in storage systems. In storage systems, one can use the available area of the medium more efficiently by compacting the data to be stored. Various techniques have previously been considered and implemented for the compacting of image bearing multi-level digital data. One such technique is known as predictive coding. This approach makes full use of a particular pertinent past to predict a signal, and then produces an error signal equivalent to the difference between the actual and predicted signals. If relatively accurate prediction is achieved, the difference between the actual signal and the predicted signal, which constitutes the error signal, has a very small amplitude most of the time. This allows the error signal to be expressed in a variable length binary code which requires much less transmission bandwidth than direct binary encoding of our original picture signal.

Another prior art technique which has proven useful in compacting digital data representative of images, is known as run-length encoding. This particular data compaction technique consists of transmitting with each non-redundant sample, a binary representation of the number or run-length of redundant (untransmitted) samples that have occurred since the previous transmitted sample. The position in the frame of any data sample may then be found by summing the number of non-redundant and redundant samples before it.

The aforementioned predictive coding and run-length encoding techniques both afford individual advantages in obtaining compression or compaction of image representative digital data. Accordingly, it has been found desirable to combine these two techniques to form two basic steps for a compression process. It has also been found desirable to utilize a run-length encoding technique which is essentially compatible with IBM computers, and also provides variable word length.

SUMMARY OF THE INVENTION

An important object of this invention is to provide an improved method and apparatus for the compression of digital data.

Another object of this invention is to provide an improved method for compacting digital data representative of images.

A further object of this invention is to provide an improved apparatus which is capable of compressing digital information representing images, to achieve a relatively high compression ratio.

Still another object of my invention is to obtain an improved method and apparatus for compressing digital information which utilizes both exhaustive predictive coding and run-length encoding techniques capable of overflow.

In carrying out my invention, in one form thereof, it is applied to a system for handling and processing digital data representing images. Such a system includes a source of digital signals and a compressor for compacting the digital data representing these signals. The compressor includes a two-dimensional predictor stage, and a run-length encoding stage. The predictor stage is a four point causal predictor which includes three one bit registers e.g. latches or flip flops for holding 3 bits for image positions adjacent to a predictable point on the previous line. Another one bit register similar to the previous three holds a bit for a previous image position on the present line on which the point is to be predicted. In addition, the predictor stage includes an exhaustive predictor logic unit. The predictor stage looks at the preceding point in a present line of the image and three points in the previous line to predict what color (black or white) the predicted point is. If the prediction is in error, a "1" is transmitted. If the prediction is correct, a "0" is transmitted. The predicted and actual values for each current or predicted picture element, are fed to an exclusive OR unit, which compares the output value of the predictor with the actual value of the current picture element. This provides a stream of digital data representing a new or error image based on a comparison between the predicted picture elements and the actual picture elements.

For encoding the new error image, a run-length encoder state is provided. This run-length encoder stage uses variable length words, with subword length $L$ related to a dual-base counting system such that $L = \log_2 (p + n)$ bits, where $p$ = the number of states in the lower order subwords; $n$ equals the number of states in successive higher and highest order subwords. The output of the compressor stage is fed to a buffer, which receives and stores the digital data after the data has been processed by the predictor and run-length encoder stages.

With such an image compression arrangement, it has been found that a relatively high compression ratio is achieved. In addition, an overflow capability is achieved by the use of dual-base counting, which adds to the efficiency in processing digital representations of images with differing picture elements per line. An additional advantage resides in the fact that the run-length encoding technique of the present invention is fully compatible with computers, and provides relatively high efficiency when used in conjunction therewith.

BRIEF DESCRIPTION OF THE DRAWINGS

The foregoing objects, features, and advantages of this invention will be apparent from the following description of the drawings, in which:

FIG. 2 is a schematic diagram of a digital data compressor for an image processing system, embodying the present invention;

FIG. 4 is a digital data decompressor for an image processing system embodying the present invention.

DETAILED DESCRIPTION

Figure 1:
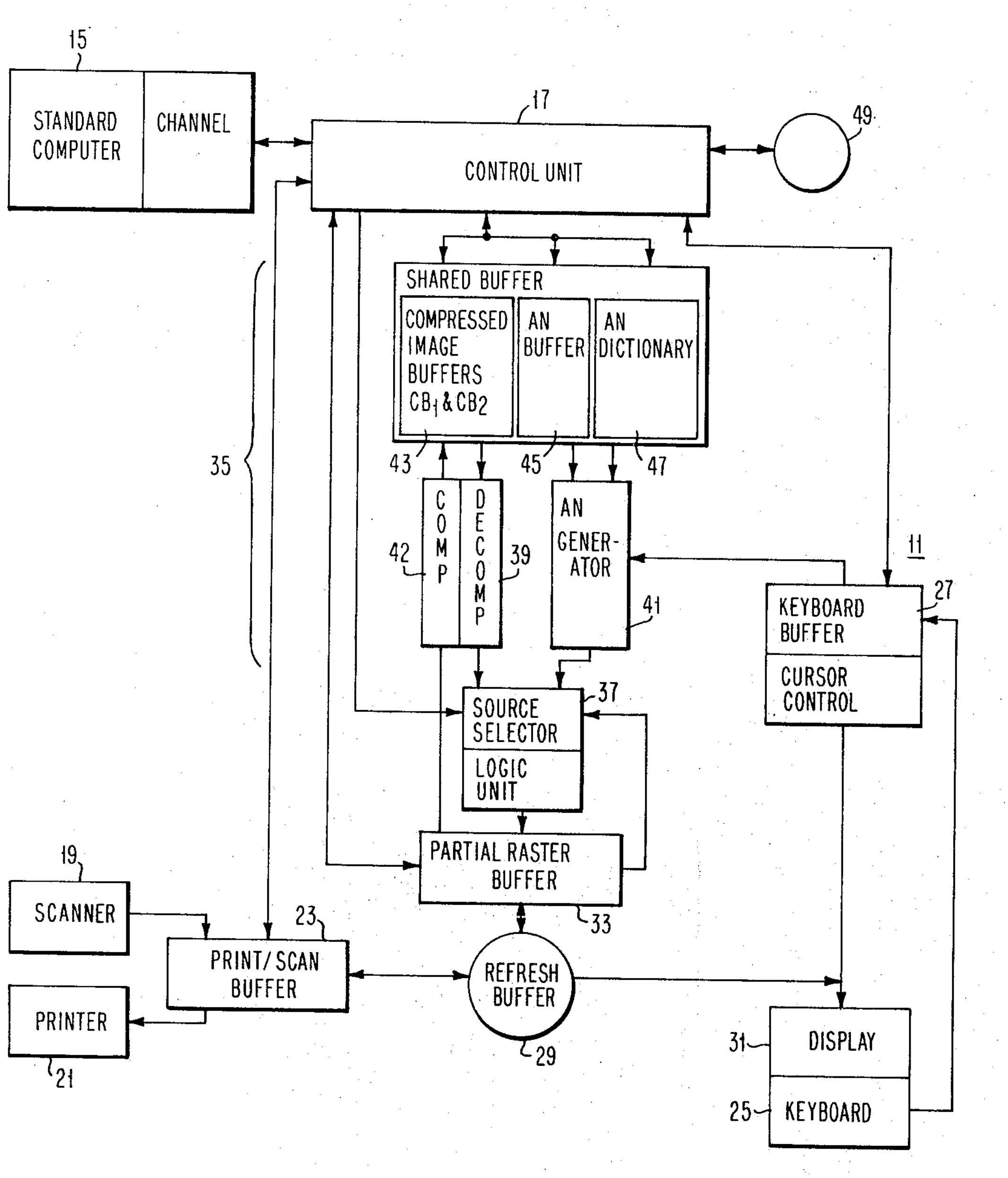
FIG. 1 is a schematic diagram of an image processing system, with lines and arrows showing the data flow to and from an exemplary compressor and decompressor unit.

Referring now to the drawings, there is shown in FIG. 1, a schematic diagram of an image processing system in which my invention may be effectively embodied. This system may be integrated into a standard computer system 15, such as the IBM S/370, that handles the storage of coded alphanumeric information and compressed image bearing information. Basically, the image processing system 11 includes a control unit 17 coupled to a scanner 19 and a printer 21 by way of a print/scan buffer 23; a keyboard 25 coupled to the control unit 17 by way of a keyboard buffer 27; a refresh buffer 29 coupled to the print scan buffer 23 and an interactive display 31; a partial raster buffer 33 coupled to the refresh buffer 29, and a buffer and compression/decompression system 35 connected between the partial raster buffer 33 and the control unit 17.

In the illustrated embodiment, the buffer and compression/decompression system 35 includes a source selector 37 connected between the control unit 17 and the partial raster buffer 33. Source selector 37 is also connected to the output of a decompressor 39 and an alphanumeric generator 41. A compressor 42 is connected between the partial raster buffer 33 and a pair of compressed image buffers 43, to compact digitized data representing images prior to storage thereof. The buffer and compression/decompression stage 35 also includes an alphanumeric buffer 45 which is used to store the image in mapped format. This particular buffer 45 is preferably the size of a complete alphanumeric or coded image. The alphanumeric buffer 45 is coupled at its output to alphanumeric generator 41. In addition, an alphanumeric dictionary 47 is coupled to the alphanumeric generator 41, to provide a source of raster data.

For storing digital data after its compression, a storage file 49 is also coupled to the control unit 17.

To store a document in the image processing system 11, the index descriptors for it are entered on the keyboard 25 at the filing station (which may combine the scanner 19, display 31 and keyboard 25). The document is placed face down on the platen of the scanner 19. The image is then electronically scanned and transferred to the refresh buffer 29. The display at the filing station is refreshed directly from the refresh buffer 29 so that the user can see exactly how the document was captured by the system. When the operator of the system is satisfied with the position and quality of the image appearing on display 31, the image appearing on scanner 19 is digitized by the scanner and a stream of digital data representing the image appearing on the scanner is passed through refresh buffer 29 and partial raster buffer 33 to the compressor 42 where it is compressed and thereafter transmitted to the storage disk at the unit 49, via control unit 17. While subsequent documents are being entered by the operator, the compressed image stored on the storage unit 49 can be transferred to a larger mass file (not shown) and indexed by the system. To retrieve a document (or a folder of documents), an indexed descriptor is entered on the keyboard 25 at the display station. The system converts the index descriptor into an address so that the proper disk cartridge is accessed and the document is transferred to the disk file 49. The user of the system can thus browse through the file folder by selecting a specific image stored in the file 49, decompressing it, and transferring it to this display. While the user is looking at one folder, it is possible for the next folder to be retrieved from the master file and transferred to the disk file 49 so that it will be ready for immediate viewing. The displayed image may be a composite of alphanumerics stored in coded form and an image stored in digital data form. While an image is displayed, the user can clear selected areas, combine pieces of various images, draw lines, or use the keyboard to add text. For making a hard copy print, the image is transferred from the refresh buffer 29 to the print buffer 23 so that the display is free to continue working. If the print buffer 23 is busy when the user requests a print, the image can be transferred to the disk file 49 until the print buffer 29 becomes available.

Turning now to an important aspect of my invention, which concerns itself with the provision of a novel and improved system for compacting and compressing digital data representing images, attention is directed to the embodiment illustrated in FIG. 2. As shown therein, the compressor 42 includes a predictor stage and a run-length encoder stage. The embodiment of the predictor stage will first be discussed.

PREDICTOR CODING STAGE

The compressor 42 includes two basic stages, a predictor stage and a run-length coding stage. Viewing FIG. 2, the compressor cycle starts when the next bit of data is read into a register 51. The register 51 has its output coupled to a line buffer shift register 53. The passage of a bit stream through the line buffer shift register 53 is controlled by AND gate 55, which receives inputs from a clock A, 57 and a clock control register 59 coupled to the predictor stage. The line buffer shift register 53 includes a number of positions equivalent to the number of bits per line, plus two. For the disclosed embodiment, which involves 1,056 bits per scan, this amounts to 1,058 positions. As shown in FIG. 2, storage positions 53A, 53B, and 53C, as well as 53D, of the register 53, are gated into registers 61A, 61B, 61C, and 61D, respectively, which are fed into the predictor logic unit 63. (See also FIG. 3*a*)

The predictor logic unit 63 is determined by a statistical analysis and physical insight into the distribution of white and black dots in a set of documents typical of the business for which the data processing system is used. During the next time cycle, the predictor logic unit 63 computes the predicted value of the next bit P, by means of the preceding picture element in the current scan line, determined from predictor register 61D, and the 3 adjacent picture elements in the previous scan line, as determined by predictor registers 61A, 61B, and 61C. For the illustrative embodiment of the present invention, and one typical set of documents, the predictor logic unit 63 shown in FIG. 3a was utilized. As shown therein, the predictor registers 61A, 61B, 61C, and 61D, are connected to AND gates 65, 67, and 69, which are in turn coupled to an OR gate 71 that provides an output to the predicted output register 73. Thus, registers 61A, 61B, and 61C, hold adjacent 3 bits from the preceding line, and register 61D holds the previous bit of the present line. At the beginning of each bit cycle, predictor register 73 is reset to 0. If the predictor logic predicts a "1," it is then set to "1." AND gates 65, 67 and 69 perform the logic operation which can be represented by the Boolean expression:

$$P = B \cdot D + \bar{A} \cdot D + \bar{A} \cdot B \cdot C$$

The results of these AND gates are sent to OR gate 71, so that if either of the 3 conditions for a "1" are satisfied, register 73 is then set to "1."

The value of point "P" is thus predicted by looking at points A, B, C, and D, and using an exhaustive logical formula or table that is not a linear relationship of these points to predict "P."

Statistical tests have been made of sample pages of data to determine the conditional possibilities of P = 1, for all the possible combinations of points A, B, C, and D being "0" or "1." A sample table is indicated below as TABLE 1. TABLE 1 was prepared by statistical analysis of 6 representative engineering drawings.

TABLE 1

| Possibility Item | A 8 | B 4 | C 2 | D 1 | Prob. value of X |
|---|---|---|---|---|---|
| No. | — | — | — | — | — |
| 0 | 0 | 0 | 0 | 0 | 0 |
| 1 | 0 | 0 | 0 | 1 | 1 |
| 2* | 0 | 0 | 1 | 0 | 0 |
| 3 | 0 | 0 | 1 | 1 | 1 |
| 4 | 0 | 1 | 0 | 0 | 0 (or 1) |
| 5 | 0 | 1 | 0 | 1 | 1 |
| 6 | 0 | 1 | 1 | 0 | 1 |
| 7 | 0 | 1 | 1 | 1 | 1 |
| 8 | 1 | 0 | 0 | 0 | 0 |
| 9 | 1 | 0 | 0 | 1 | 0 |
| 10 | 1 | 0 | 1 | 0 | 0 |
| 11 | 1 | 0 | 1 | 1 | 0 (or 1) |
| 12 | 1 | 1 | 0 | 0 | 0 |
| 13* | 1 | 1 | 0 | 1 | 1 |
| 14 | 1 | 1 | 1 | 0 | 0 |
| 15 | 1 | 1 | 1 | 1 | 1 |

*For items 2 and 13 in TABLE 1, the probability was close to 50%.

Figure 3A:
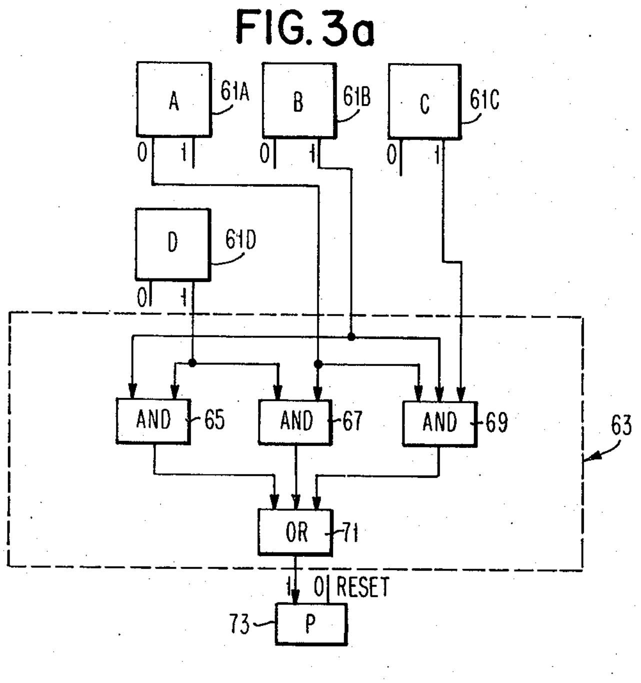
FIG. 3*a* is a schematic diagram of a predictor stage, showing in greater detail the components of the predictor stage set forth in FIG. 2.
Figure 3B:
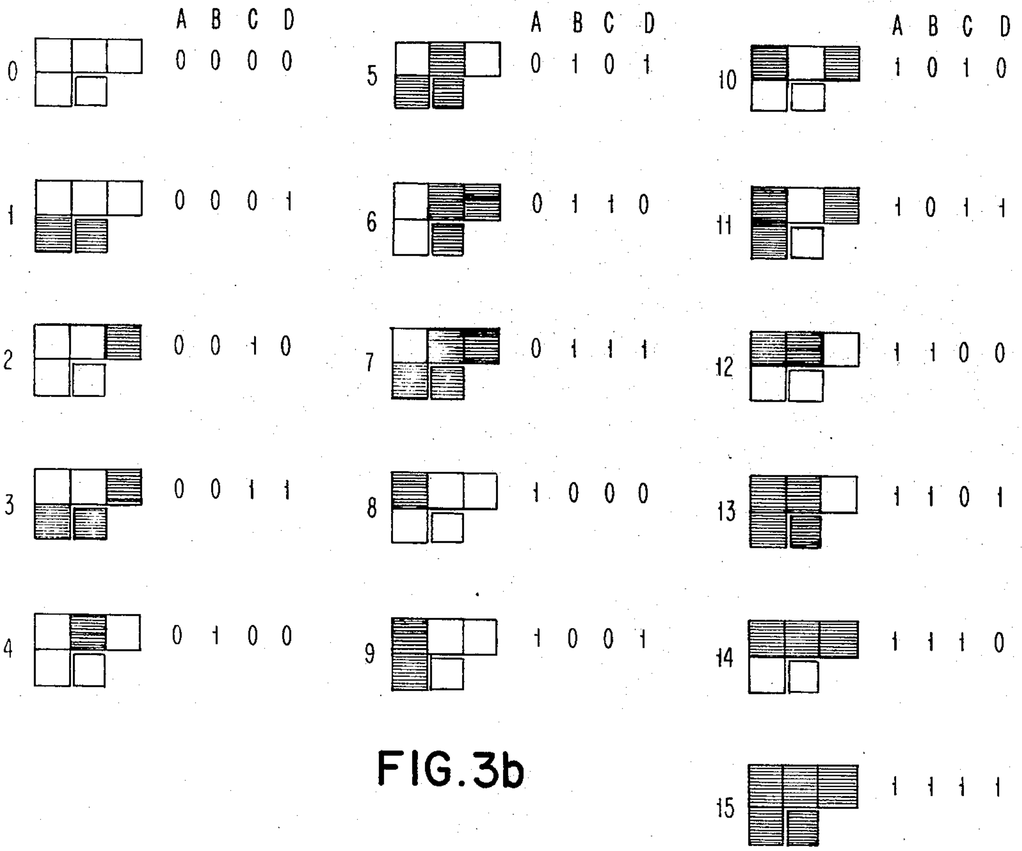
FIG. 3*b* is an exemplary prediction coding system which may be utilized in conjunction with the compressor shown in FIG. 2.

A graphical illustration of the mathematical table set forth in TABLE 1, is included herein as FIG. 3*b*. Thus, as shown in TABLE 1, for each of 16 possible combinations of neighboring picture elements A, B, C and D, the predictor's guess is indicated to the right in the form of a binary "1" for each blank dot and a "0" for each white dot.

As further shown in FIG. 2, the predicted value of the next point is thus stored in register 73 of the predictor output. An actual register 75 is also provided, to receive the actual value of the data from data input register 51. The outputs of predictor register 73 and actual data register 75 are fed to an exclusive OR unit 77. The OR unit 77 provides a "1" if there is an error when comparing the actual data in register 75 with the predicted data of register 73, and a "0" if the predicted value is correct. During the next cycle time, the value of register 77 is gated out so that if a "1" is present, it passes to line 77*a* and if a "0" is present, it passes to line 77*b*.

From the above description of the prediction stage, it will be understood that the output of the predictor is compared with the value of the current or actual picture element in the original image. If they are the same, a pulse is passed through line 77*b* to the run-length encoder by the exclusive OR unit 77. On the other hand, if the predicted value and the actual current image values are different, an error has been made, and a "1" bit is passed through OR circuit 155 to AND circuit 153 which switches control to clock B, 151 for transferring the accumulated count from register 78–81 to the buffer 140, as described hereinafter. The result of this process through OR circuit 77 can be thought of as a new image where the "1" bits represent black and the "0" bits represent white. This is called an error image. No compression has occurred up to this point (e.g. at output of OR 77). However, the error image is a transformation of the original image into a form which makes the run-length encoder much more efficient.

Although one particular preferred embodiment of a predictor stage has been shown, my invention is also considered to embrace other types of exhaustive and non-linear predictors which involve the utilization of a specified plurality of adjacent picture points in present or preceding scan lines for furnishing the prediction of a current picture element.

RUN LENGTH ENCODER STAGE

As a further aspect of the present invention, the run-length encoder provides for the coding of the run-lengths of "0" and "1" errors in a dual base counting system having a subword length unit $L$ of $\log_2 (p + n)$ bits. In general, a dual-base counting system can take either of two forms:

$$N = a_0 (n^0p^0) + b_0 (n^0p^1) + b_1 (n^1p^1) + b_2 (n^2p^1) + \cdots + b_m (n^mp^1)$$

or $$N = a_0 (n^0p^0) + a_1 (n^0p^1) + a_2 (n^0p^2) + \cdots + a_m (n^0p^m) + b_0 (n^1p^m)$$

where $N$ is the run length count, $p$ is the number of states in the lowest order subword, $n$ is the number of states in successiver higher and highest order subwords, and the $a_i$ and $b_i$ are counting coefficients. Such a system has been tested both for the compression and decompression stages with software and hardware using the first equation with $p = 10$, $n = 6$ and $L = \log_2 (10+6) = 4$. For such a system, the run-lengths may be coded into 4, 8, 12, 16, etc. bit code groups. The most frequently occurring lengths are coded into 4 bits or 8 bits. The nature of the mutually-exclusive, dual-base counting states gives an automatic comma available for separating the variable length code groups as will be further elaborated upon hereinafter. Some examples of dual-base ($p$, $n$) counting systems for run-length encoding are listed below as TABLE 2, 3, 4 and 5, for purposes of further discussion. The columns are as follows:

| | | |
|---|---|---|
| coefficient weight (CW) | subword state (SS) | equation term |

The subword state is expressed in binary notation and the particular equation term heads the column. In TABLES 4 and 5, the higher order equation terms have also been designated by hexidecimal notation which appear in parenthesis.

TABLE 2

*a* A (4,4) counting system with subword length, *L*=3:

| $b_3$ $(n^3p^1)$ | $b_2$ $(n^2p^1)$ | $b_1$ $(n^1p^1)$ | $b_0$ $(n^0p^1)$ | $a_0$ $(n^0p^0)$ |
|---|---|---|---|---|
| 0:100:000 | 0:100:000 | 0:100:00 | 0:100:00 | 0:000:01 |
| 1:101:256 | 1:101:064 | 1:101:16 | 1:101:04 | 1:001:02 |
| 2:110:512 | 2:110:128 | 2:110:32 | 2:110:08 | 2:010:03 |
| 3:111:768 | 3:111:192 | 3:111:48 | 3:111:12 | 3:011:04 |

some examples:

77773 = (768 + 192 + 48 + 12 + 3) = 1,023
7773 + (192 + 48 + 12 + 3) = 255
773 + (48 + 12 + 3) = 63
73 + (12 + 3) = 15
3 = 3

TABLE 3

A (5,3) counting system with subword length, *L*=3:

| $b_3$ $(n^3p^1)$ | $b_1$ $(n^2p^1)$ | $b_1$ $(n^1p^1)$ | $b_0$ $(n^0p^1)$ | $a_0$ $(n^0p^0)$ |
|---|---|---|---|---|
| 0:101:000 | 0:101:00 | 0:101:00 | 0:101:00 | 0:000:0 |
| 1:110:135 | 1:110:45 | 1:110:15 | 1:110:05 | 1:001:1 |
| 2:111:270 | 2:111:90 | 2:111:30 | 2:111:10 | 2:010:2 |
| | | | | 3:011:3 |
| | | | | 4:100:4 |

some examples:

77774 = (270 + 90 + 30 + 10 + 4) = 404
7774 = (90 + 30 + 10 + 4) = 134
774 = (30 + 10 + 4) = 44
74 = (10 + 4) = 14
4 = 4

TABLE 4

A (12,4) counting system with subword length, L=4:

| $b_2(n^2p^1)$ | $b_1(n^1p^1)$ | $b_0(n^0p^1)$ | $a_0(A^0p^0)$ | |
|---|---|---|---|---|
| 0:1100:000(C) | 0:1100:000(C) | 0:1100:00 | 0:0000:0 | 6:0110:6 |
| 1:1101:192(D) | 1:1101:048(D) | 1:1101:12 | 1:0001:1 | 7:0111:7 |
| 2:1110:384(E) | 2:1110:096(E) | 2:1110:24 | 2:0010:2 | 8:1000:8 |
| 3:1111:586(F) | 3:1111:144(F) | 3:1111:36 | 3:0011:3 | 9:1001:9 |
| | | | 4:0100:4 | 10:1010:10 |
| | | | 5:0101:5 | 11:1011:11 |

some examples:

FFFB = (586 + 144 + 36 + 11) = 767
FFB = (144 + 36 + 11) = 191
FB = (36 + 11) = 47

TABLE 5

A (10,6) counting system with subword length, L=4:

| $b_2(n^2p^1)$ | $b_1(n^1p^1)$ | $b_0(n^0p^1)$ | $a_0(n^0p^0)$ | |
|---|---|---|---|---|
| 0:1010:0000(A) | 0:1010:000(A) | 0:1010:00(A) | 0:0000:0 | 6:0110:6 |
| 1:1011:0360(B) | 1:1011:060(B) | 1:1011:10(B) | 1:0001:1 | 7:0111:7 |
| 2:1100:0720(C) | 2:1100:120(C) | 2:1100:20(C) | 2:0010:2 | 8:1000:8 |
| 3:1101:1080(D) | 3:1101:180(D) | 3:1101:30(D) | 3:0011:3 | 9:1001:9 |
| 4:1110:1440(E) | 4:1110:240(E) | 4:1110:40(E) | 4:0100:4 | |
| 5:1111:1800(F) | 5:1111:300(F) | 5:1111:50(F) | 5:0101:5 | |

some examples:

FFF9 = (1800 + 300 + 50 + 9) = 2159
FF9 = (300 + 50 + 9) = 359
F9 = (50 + 9) = 59

Taking TABLE 2 as a first example of the dual-base (*p, n*) counting system for run-length coding; for this particular system the lowest order subword uses the first $p = 4$ states from 0–3, the next higher order subword uses the next $n = 4$ states from 4–7, and the next higher order subwords continue to use the states from 4–7, etc. If it is desired to encode the decimal number 886, this would be equivalent to octal 75752 and could be encoded in binary fashion as 111101111101010. The encoding techniques set forth for TABLES 3 and 4 are substantially similar to that explained for TABLE 2.

TABLE 5 shows a particular preferred embodiment of the invention, where $p = 10$ and $n = 6$. As an additional example, if it is desired to encode the decimal number 359 from TABLE 5, this equals 9 + 50 + 300. So first the $b_1$ coefficient with state F code is sent, to symbolize the number 300. This is followed by the state F from the $b_0$ column to symbolize the code for number 50. Then the state 9 from the $a_0$ column is sent. This would be in the binary form of 1111 1111 1001.

A specific advantage of the $p = 10$, $n = 6$ type run-length encoding technique of TABLE 5 resides in the fact that this counting system readily matches the hexidecimal numbering system and 4-bit subword "half-byte" L commonly used in computer systems.

Another advantage of the dual-base (*p, n*) counting system for run-length encoding is that this technique provides unusual groups which can be used for special purposes such as "blank line," "end of line" and "end of image." Specifically, in counting, leading "zeros" in the subword of base *n* are suppressed and available to prefix any special code words. Thus, for the (10, 6) system, the following special codes are available:

A0 through A9 – 10 special codes with two subwords

AA0 through AF9 – 60 special code words with three subwords

AAA0 through AFF 9 – 360 special codes with four subwords

Viewing the above arrangement of special codes, it will be noted that the letter A, since it denotes a zero for the subword of base 6, can be used as a prefix to generate a special code from any of the various numbers. Alternatively, the letter "A" may be used alone where only one special code is needed as will be described for the (10, 6) hardware that follows. It will further be noted that the following special codes could alternatively be provided for the (10, 6) counting run-length encoding technique, as the situation warrants.

A0 = End of scan line

A1 = Blank scan line or scan line with no black picture element (no errors)

A9 = End of page

AA9 = Alternate end of page where necessary, to pad coded data to integral byte boundary.

Table 6 is presented at this point to demonstrate the counting system employed in the encoder of FIG. 2 using a (10, 6) system.

TABLE 6

Mutually-exclusive counting states for (10, 6) dual-base example;

| *p*-States | Counting Weight |
|---|---|
| 0000 | 0 |
| 0001 | 1 |
| 0010 | 2 |

| | |
|---|---|
| 0011 | 3 |
| 0100 | 4 |
| 0101 | 5 |
| 0110 | 6 |
| 0111 | 7 |
| 1000 | 8 |
| 1001 | 9 |
| *n*-States | Counting Weight |
| 1010 | 0 |
| 1011 | 1 |
| 1100 | 2 |
| 1101 | 3 |
| 1110 | 4 |
| 1111 | 5 |

Turning now to a further description of the illustrative compressor with regard to its emobdiment of the run-length encoding technique of the present invention, it will be noted that the four conventional binary counters 78, 79, 80 and 81 are connected in that order, in series, from line 77*b* of the predictor stage, to store the run-length count for the number of error free predictions before the next error. Counter 78 counts to the base $p = 10$ and counters 79, 80 and 81 to the base and equals 6. When reset, the counters 78, 79, 80 and 81 are initialized to the zero weight values for their base shown in their associated registers 78R, 79R, 80R and 81R. When the counter 78, 79, 80 and 81 give a carry to the next higher order counter, they are reset again to the zero weight values for their base registers 78R, 79R, 80R and 81R, respectively. Thus, when a "1" is added to counter 78, if there is a carry, a "1" is added to register 79, and flip-flop 79A (for flagging the fact that in addition to counter 78 being used, counter 79 is now also being used) is set to "1." In a like manner, during subsequent subcycles, counter 79, 80 and 81 may receive a carry and flip-flops 80A and 81A are set to "1" if indicated.

It is most important to note that a run-length encoding technique of the present invention includes a feature for a special code when a full 1,056 bit line of no errors is found. After each incrementing of the counters, the contents of counter 78, 79, 80 and 81 are gated respectively to associated AND gates 88, 89, 90 and 91 (where logic functions are shown in FIG. 2). Then, the outputs of these four AND gates (88, 89, 90 and 91) are gated to AND gate 100 (whose logic function is shown in FIG. 2) which thus detects the dual-base states for a count of 1,056. This sets clock control register 59 to "0" stopping any further reading of input data pending a selective reset from flip-flop 169. This also sets a register 120 for counting down the transfer of subwords of the compressed code into a compressed buffer memory 140. The compressed buffer memory 140 receives the output of the predictor stage which has in turn been compressed into a sequence of dual-base count subwords or a special code, as shall further be set forth in the "transfer cycle" described hereinafter.

If the output of AND gate 100 is "1," indicating a special code, then flip-flops 81A, 80A and 79A are reset "0," and counter 78 is set in the special code state "A" (1010) by shifting contents of register 78X into counter 78.

For each error or special code, a "transfer cycle" occurs for the run-length encoding stage of the compressor shown in FIG. 2. For such an occurrence, a clock B, 151, inputs to AND gate 153. Gate 153 also receives an input from OR gate 155, to which AND gate 100 (special code) and line 77*a* (error) are connected. Clock 151 inputs AND gate 153, when either line 77*a* produces a binary "1" or AND gate 100 is a binary "1," whereupon the register 120 starts counting down from binary "100," first to binary "011," the address of counter 81 decoded by logic unit 157 from counter 120. The contents of counter 81 are gated through AND gate 81B to AND gate 81C to switch 159 for the compressed buffer memory 140 if flip-flop 81A is on. Then a pulse is ANDed with the output of flip-flop 81A through AND gates 163 and adder 165, to increment address counter 161. It should be noted that if flip-flop 81A is "0," nothing happens during these cycles, which corresponds to a condition that either the run-length was too short to require use of counter 81, or that the run-length was 1,056 so that a special code in counter 78 is used.

On the next subtract cycle of counter 120 controlled by clock 151, counter 120 reads "010," the address of counter 80. If flip-flop 80A is on, the contents of counter 80 are gated to compressed buffer memory 140, and address counter 1601 is incremented. On the next cycle after that, counter 120 reads "001," the address of counter 79, and the contents of counter 79 are transferred to the compressed buffer memory 140. On the next cycle, counter 120 reads "000." This is the address counter 78, which has its contents transferred to compressed buffer memory 140. After each of these aforementioned cycles, at times AND gate 167 (coupled to the output of counter 120) is tested, and if all zeros occur, it sets a reset register 169, which resets the clock control register 59 to "1" to allow the resumption of reading input data. When reset register 169 is on, the following devices are reset (control lines being omitted from FIG. 2 to enhance simplicity):

register 59 reset to "1"

counters 81, 80 and 79 reset to "1010"

counter 78 reset to "0000"

flip-flops 81A, 80A, 79A reset to "0"

counter 120 reset to "100"

reset register 169 reset to "0"

The next bit of data is thereupon read into input register 51, as the compression process continues.

OPERATION OF STAGES

Figures 5A, 5B, 5C, 5D:
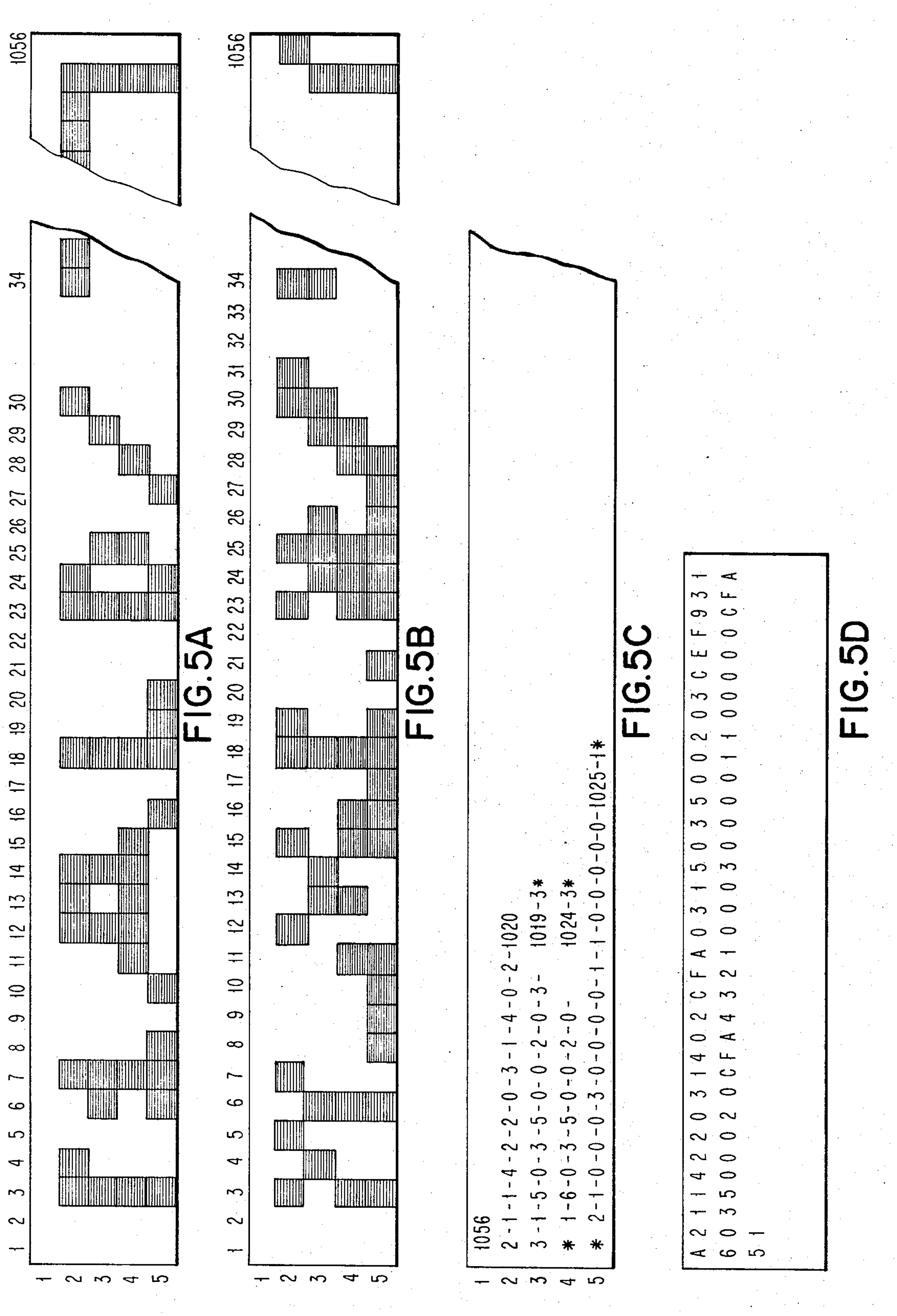
FIG. 5A is a bit position layout for the first five scan lines of a typical image.
FIG. 5B is a bit position layout of the error image derived from the actual image layout of FIG. 5A.
FIG. 5C is a number layout for the run-length encoder derived from the error image layout of FIG. 5B with separate lines to illustrate the method.
FIG. 5D is a code layout (in compressed format) from FIG. 5C for the run-length encoding technique involving a (10, 6) type number system.

For a further understanding of the operation of the prediction and run-length encoding stages of the present invention, attention is now directed to FIGS. 5A and 5B. FIG. 5A shows the format of a typical scanned and digitized image to which the predictor code of FIG. 3*b* may be applied. When the predictor code is applied, the errors shown in the layout of FIG. 5B are thereby obtained. Thus, for example, it will be noted that for line 1 of the actual image, all of the bits 1–1056 have predictor reference points A, B, C and D = "0" (white). As a result, prediction category number 0 of TABLE 1 and FIG. 3*b* applies. As a result, assuming that the previous line was blank, all of the bit positions for line 1 would be predicted as "0'"s or whites. Accordingly, there are no errors for the whole line, which provides a blank line 1 for FIG. 5B.

For line 2 of FIG. 5A, it will be noted that bit 2–3 (i.e., line 2, bit 3) is a black. The prediction code of FIG. 3B puts this in category no. 0; since reference points A, B, C and D relative to predicted point 2–3 are all white. Accordingly, a "0" (white) is predicted. When compared with point 2–3 of FIG. 5A, which is black, it is found that this prediction for point 2–3 is in error. Therefore, point 2–3 of FIG. 5B has a black in that position, signifying the error.

Taking now bit 2–4 of FIG. 5A, it will be found that this bit of the actual image is also black. However, here the predictor code of FIG. 3B, finds that A, B, and C = "0" (white), but D = "1" (black). Hence, prediction category no. 1 applies, so that a "1" (black) is predicted. When point 2–4 of FIG. 5A, which is black, is compared with its prediction (from FIG. 3B, also black), no error is found. Thus a white or "0" is found in bit position 2–4 of the error image in FIG. 5B. In like manner, all of the predictions for the bit positions of the image of FIG. 5A, may be determined. The resulting error image when the prediction code of FIG. 3B is used, is depicted by FIG. 5B.

FIG. 5C represents a numerical depiction of how the error image of FIG. 5B would be handled by the run-length encoder of my invention. For example, in line 1, a code correlation of 1,056 whites would indicate no errors. For line 2, the number 2, first appearing, represents two white bit positions, automatically followed (in the absence of a subsequent zero) by a single black bit position. This correlates to bit positions 2–1, 2—2, and 2–3 of the error image. The number 1, next appearing, represents one white bit, followed by a black, which correlates to bit positions 2–4 and 2–5 of the error image of FIG. 5B. Likewise, the next number 1, correlates to bit positions 2–6 and 2–7 of the error image. Then after that, a number 4 appears. This correlates to the four whites of bit positions 2–8 to 2–11 inclusive, followed by the black of bit position 2–12.

Using the same reasoning already set forth above, the first and second number "2"s of line 2 of FIG. 5C, which appears after number 4, each denote two white bit positions and a black bit position for the respective bit positions 2–13, 2–14, 2–15; and 2–16, 2–17, 2–18 of the error image.

It has previously been stated that each positive digit besides indicating the number of bit positions between errors (black) also automatically provides a black (implied) at the end of each run-length of whites. Since bit position 2–19 of FIG. 5B shows a black appearing after another black, a "0" appears after the second number 2 in the line 2 sequence for FIG. 5C. This "0" signals the presence of an additional black besides the "automatic" black at the end of each run-length of whites.

The number 3, next appearing in line 2 of FIG. 5C, denotes the three consecutive whites, followed by a black, for bit positions 2–20, 2–21, 2–22, and 2–23. Then, after the number 3, the number 1 denotes respective white and black for bit positions 2–24, 2–25.

Next, the number 4, followed by a "0" denotes four consecutive whites for bit positions 2–26, 2–27, 2–28, and 2–29, and two consecutive blacks for bit positions 2–30, 2–31.

Then, a number 2, which appears next toward break line for line 2 of FIG. 5C, denotes two consecutive whites followed by a black for bit positions 2–32, 2–33, and 2–34.

Lastly, the number 1020 appears to the right at the end of line 2 for FIG. 5C. This indicates 1020 whites for the bit positions 2–35 to 2–1055, followed by a black in bit position 2–1056.

In similar fashion to the technique described above for determining the run-length numbers of line 1 of FIG. 5C from the error image of FIG. 5B, the run-length numbers for lines 2, 3, 4, and 5 may be obtained for FIG. 5C. Thus, each number denotes the number of consecutive whites appearing in an unbroken sequence, plus an automatic black at the end of the sequence. If two or more blacks appear at the end of a sequence of whites, a "0" is added to denote each additional consecutive black after the automatically denoted black. It should further be noted that at the end of lines 3, 4 of FIG. 5C, and at the beginning of lines 4, 5 thereof, asterisks (*) appear. The asterisk (*) at the end of a line means a continuation of the same color at the beginning of the next line. The asterisk (*) is included here for explanatory purposes. It does not have to be included in the coder or decoder.

In FIG. 5D there is shown the encoding format for the run-length numbers of lines 1–5 of FIG. 5C. Here, it will be noted that the letter "A" first appearing denotes a fully blank scan line. Then, near the middle of the first line of FIG. 5D, the combination of CFAO, assuming the $(p, n)$ number system of (10, 6) is used, provides the code for the number "1020."

In operation, the binary code for the first line run-length sequence of A – 2 – 1 – 1 – 4 – 2 etc. would be "1010 0010 0001 0001 0100 0010," with the first four binary digits denoting the code for a blank scan line. It should be noted that the compression code for the separate lines is run in sequence to maximize utilization of available storage area (See FIG. 5D).

OVERFLOW

It is important to note that by using the dual-base counting system in the encoder, more inherent power is obtained for encoding large amounts of overflow, than has been present in related prior art systems. For a further understanding of this concept, attention is directed to the following equation.

$$N = a_0(p^0n^0) + b_0(p^1n^0) + b_1(p^1n^1) + b_2(p^1n^2) + \ldots + b_i(p^1n^i) + \ldots$$

where $N$ = the run-length, represented by coefficients $a_0$ = coefficient of low order base $p$ subword counter, $b_0$ = coefficient of second position or last base $n$ subword counter $b_1$ = coefficient of third position or next to last high base $n$ subword counter $b_2$ = coefficient of fourth position or third last base $n$ subword counter $b_i$ = coefficient of $i+2$ position or $i-1$ from last base $n$ subword counter $p^0 = p$ to the zero power or "1"

$p^1 = p$ (number of lowest order subword states)

$n^0 = n$ to the zero power or "1"

$n^1 = n$ (number of higher order subword states)

$n^2 = n^2$ $n^i = n$ to the $i$ power and the coefficients $a_0$ and $b_i$ are predefined to be of any constant length in bits and uniquely decodable into two mutually exclusive groups.

For computer hardware based on constant length words, a commonly desirable constraint is that the coefficients $a_0$ and $b_i$ have identical constant length:

$$L_a = L_b = \log_2 (p + n),$$

where the subword lengths $L_a = L_b$, and $p$ as well as $n$, are integer valued. In such a case, the parameters $(p, n)$ are all that are necessary to specify the code.

For the dual-base code where $L_a = L_b = 4$, then $$N = a_0 \cdot 10^0 + b_0 \cdot (10^1 \cdot 6^0) + b_1(10^1 \cdot 6^1) + b_2(10^1 \cdot 6^2)$$
$$\ldots b_i(10^1\ 6^1) + \ldots$$
$$N = a_0 + b_0(10) + b_1(60) + b_2(360) \ldots + b_i(10 \cdot 6^i) + \ldots$$

and $\{a\}=\{0000, 0001, 0010, 0011, 0100, 0101, 0110, 0111, 1000, 1001\}$

For physical implementation of the above approach, one binary counter (such as counter 78 of FIG. 2) to the base $p$=10 is required, with a "carry" to a cascaded series of counters (such as counters 79, 80, 81 of FIG. 2) operating to the base $n$=6. The latter counters use the remaining six mutually exclusive states available out of the 16 possible binary combinations of length 4 and may be expanded indefinitely. Although such a code does not generally provide a perfect match, it approximates with relatively high accuracy the optimal varying word lengths needed for encoding runs while using simple hardware. A classical prior art Huffman type code, on the other hand, would generally require much more hardware to perform an encoding process that requires consultation of tables.

It should further be noted that a significant advantage of my run-length encoder resides in the fact that it provides a geometrically increasing, weighted infinite overflow capability.

DECOMPRESSION

FIG. 4 illustrates, by way of example, an exemplary decompressor for use with my invention. Although various elements of the compressor and decompressor and decompressor can be shared by switching between compress and decompress modes, they are for simplicity shown here as separate units.

The compressed buffer memory 140 contains part of a page of compressed error data in the dual-base counting form. Conceptually this data is assembled in the A-shift registers 281–284 and is then transferred on for count down in the B-shift and count registers 291–294. A third set of L-shift registers 280A–280D contain special case data to be loaded upon receipt of the special character "1010" (hexidecimal "A"). Details of these operations that describe the routing of data between major registers will follow a paragraph on general register control and definitions.

All transfers of data from the compressed buffer memory 140 down through the aforementioned A, B and L registers are parallel, by four-bits (half-bytes). A data half-byte from compressed buffer memory 140 first goes into register 285. Meanwhile, the previous half-byte is routed into A-shift registers 281–284 by switch 259 under control of the four decoded states of counter 220. At some point, receipt of input data is temporarily suspended because "stop cycle" flip-flop 288 is set, which acts to inhibit the gated clock A from advancing address counter 261 and inhibits further data routing by switch 259. The "stop cycle" also causes all the registers 281–284, 280A–280D and 291–294 to shift simultaneously. Meanwhile, switches 301B and 301A provide data routing under the control of "blank" and "copy" flip-flops 267 and 289, respectively. During a "shift cycle," indicated by flip-flop 286 in a "1" state, data in A-shift registers 281–284 is right-justified under the control of counter 220. During "blank cycle," indicated by flip-flop 287 in a "1" state, switch 301B loads special data from L - shift registers 280A–280D into the A-shift registers 281–284. This loads a decimal count of "1056" (hexidecimal C F D 6 representing a "blank" line of no error data. During a "copy cycle," indicated by flip-flop 289 in a "1" state, switch 301A routes output data from A-shift registers 281–284 to the B-shift registers 291–294. All flip-flops and registers are initialized by system reset flip-flop 280 to a "0" state, with the exception of registers 292–294 (see "initial stage" in TABLE of FIG. 4) which are reset to "1010" (system reset lines and normal clock lines to flip-flops and registers are not shown for simplicity). The inverted signal from flip-flop 260 then gates clock A 251 through an AND gate into counter 220 and address counter 261. The gated clock signals cause address counter 261 to advance and access successive half-bytes of data which are transfered from compressed buffer memory 140 to register 285. Counter 220 is a conventional two bit up-counter whose four states are decoded for output control signals. As the counter advances from state "00" through "11," switch 259 gates successive half-bytes from register 285 into registers 284, 283, 282 and 281, respectively.

The decoding logic attached to register 285 checks all incoming half-bytes for the condition of not having an ((8 and 4) or (8 and 2)). This test for the occurrence of any of the 10 p-states of a lower-order subword, which in this embodiment indicates the end of a varying length word. When one of the 10 $p$-states is detected the "shift cycle" flip-flop 286 is set to "1," and sets "stop cycle" flip-flop 288 to halt the incoming data and start the shifting action. Counter 220, which has not stopped, continues to increment and counts the shifts until it overflows and returns to state "00." This state "00" is decoded with "shift cycle" and used to set "copy cycle" flip-flop 289, and used alone for resetting "shift cycle" flip-flop 286. As a result, just enough shifts will have occurred to "right-justify" the data in A-registers 281–284 before flip-flop 286 is reset.

With the "copy cycle" indicated, switch 301A is gated such that output data from A-shift registers 281–284 is now routed to the B-shift and count registers 291–294. Counter 220 continues to increment and again overflows to state "00" when the four half-bytes have been copied from the A to B registers. The decoded counter 220 state "00" in conjunction with the presence of a "copy cycle" causing flip-flops 288 and 289 to be reset to "0," and alone causes count down flip-flop 260 to be set to a "1." The "count-down" process follows, as will be described further on.

If the first half-byte to be received is a "1010" (hexidecimal "A"), it will be detected by the decode logic attached to register 284. This special code causes "blank cycle" flip-flop 287 to be set to "1" and sets "stop cycle" flip-flop 288, to halt incoming data and start the shift register action. The special code also causes 220 to be reset to state "00" (with flip-flop 287 not yet in a "1" state). With the "blank cycle" initiated, switch 301B is gated such that special data from L-shift register 280A–280D is now routed to A-shift registers 281–284. Counter 220, which has been reset but not stopped, continues to increment and overflows to state "00" when four half-bytes have been copied from the L TO A-registers. The decoded state "00" is used with "blank cycle" to set "copy cycle" flip-flop 289 and alone for resetting "blank cycle" flip-flop 287. As a result, just enough shifts will have occurred to load the four hexidecimal half-bytes "C F D 6" (decimal 1056) into A-registers 281–284 before flip-flop 287 is reset. A "copy cycle" follows as before to now transfer this data down to the B-registers 291–294.

Note that the state "1010" only activates a "blank cycle" if it is the leading subword in a word and falls into register 284. This is then a "leading-zero" (which is not a permissible state in the kind of variable-length counting with "leading zero" suppression) and is utilized for indicating the start of a special code word. For this embodiment there is only one special code word and hence it is only one half-byte long. However, all of the special code words previously defined are recognizable as "special" by this "leading-zero" property, which can then be used to initiate subsequent decoding to isolate it and implement the corresponding special action.

Although flip-flop 288 is reset at the end of a "copy cycle" to allow transfer of input data to resume, this transfer is actually inhibited until the "count down" process is completed.

If not a numeric data half-bytes are successively transferred to registers 284, 283, 282, 281 (in that order) from register 285 under the control of the conductor 220. This process is called cycle mode.

This disconnects clock A, 251 and allows Clock B, 257 to count down the B-register group. This group consists of conventional binary count-down registers with the added restriction that certain states are not used. After being loaded from the A-registers, they are counted down with carry until they reach dual-base count of zero ("AAAO" in hexidecimal for this embodiment). Register 291 has "1" subtracted from it for each pulse from clock B. A carry from register 291 is detected by detecting "1111," which results from subtracting "1" from "0000." The "carry" is implemented by subtracting "1" from the next register 292 and carryresetting register 291 to "1001." Similarly, register 292 is carry-reset to "1111" when "1001" is detected, and "1" s subtracted from the next register.

In the late part of each cycle of clock B, 257, logic circuits 381–384 test for the states representing zero conditions in their related registers, and are ANDed to set stop count-down register 206 to "1," when all registers are at the equivalent to zero. During the count-down, a "0" is put into register 207 during each cycle. When stop count-down register 206 is set to "1," a "1" bit is sent through AND gate 310 to register 207.

During each cycle of the count-down and during the "1" bit cycle afterward, a shift pulse is sent through AND gate 209 which shifts shift register 302. With each shift of register 302, the latest picture point, D and three previous-line points A, B and C are sent to the predictor 270. The predictor predicts the value of the next picture point and sends the predicted value to register 208. FIG. 3A shows the details of exemplary predictor 63. The error bit and the predicted bit are exclusive ORed to regenerate an original picture point, which is then loaded into a register for input to line shift register 302.

The occurrence of a "1" at AND gate 310 resets register 260 to "0" to allow clock A 251 to control the transfer of another code group from the compressed buffer to the A-register group.

It will now, therefore, be seen that I have provided a new and improved data compaction system for digitized image information. The system concept affords flexibility in that a predictor or dual-base counter can be tailored to an application, while also lending itself to compatible use with a byte addressable standard computer for processing image representative information.

While in accordance with the Patent Statutes, I have described what at present is considered to be the preferred embodiment of this invention, it will be obvious to those skilled in the art that various changes or modifications may be made therein without departing from the present invention.

What I claim is:

1. A system for compressing a stream of digital data representing an original image, said system comprising:

an input stream of digital data representing said original image;

an exhaustive, non-linear predictor stage having its input connected to said stream for predicting the value of a current picture element represented by said digital data, based on the values of adjacent previous picture elements represented by said digital data, said predictor stage including:

means for comparing the output value of said predictor with the actual value of the current picture element, thereby to provide a stream of digital data representing a new image correlated to errors produced by said predictor:

and a run length encoder stage connected to the output of said predictor stage for encoding the new error correlated image, said run length encoder stage using a variable word length, which is a multiple of subwords of length L whose $2^L$ possible states are divided into two mutually-exclusive, unequal groups such that $L= \log_2 (p+n)$ bits, where:

$p$ = the number of states in the lowest order subwords $n$ = the number of states in successive higher and highest order subwords;

and a buffer for receiving and storing the digital data after said data has been processed by said predictor and said run length encoder stages.

2. The system of claim 1 wherein the subword length unit is 4 bits.

3. The system of claim 1 wherein said run-length encoding stage additionally includes:

a first binary counter to the base $p$ having a carry output, and a cascaded series of binary counters connected to said carry output, thereby providing an overflow capability for said stage.

4. The system of claim 1 wherein the subword length unit is 3 bits.

5. The system of claim 1 wherein the subword length unit is 5 bits.

6. A system for compressing a stream of digital data representing an original image, said system comprising:

an input stream of digital data representing said original image;

an exhaustive, non-linear predictor stage having its input connected to said stream, said predictor stage including:

first, second, and third registers for holding bits representative of adjacent picture elements of a previous scan line, a fourth register for holding bits representative of a picture element preceding a predictable picture element of a current scan line, a predictor unit for logically predicting the value of the predictable picture element of said current scan line based on the binary values of the bits held in the first, second, third and fourth registers of the predictor stage, a predictor register for receiving the output of said predictor logic unit, and means for comparing the output value of said predictor register with the actual value of said predictable picture element thereby to provide a stream of digital data representing a new image correlated to errors produced by said predictor stage;

a run length encoder using a variable word length, which is a multiple of subwords of length L whose $2^L$ possible states are divided into two mutually-exclusive, unequal groups such that $L = \log_2 (p+n)$ bits, where:

$p$ = the number of states in the lowest order subwords $n$ = the number of states in successive higher and highest order subwords;

and a buffer for receiving and storing the digital data after said data has been processed by said predictor and said run length encoder stages.

7. The system of claim 6 wherein $p = 12$, $n = 4$, and the subword length unit is 4 bits.

8. The system of claim 6 wherein $p = 10$, $n = 6$, and the subword length unit is 4 bits.

9. The system of claim 6 additionally comprising:

logic means connected to said run length encoder stage for selecting a predetermined otherwise unused subword combination in response to detection of a totally errorless scan line.

10. The system of claim 6 wherein $p = 5$, $n = 3$, and the subword length unit is 3 bits.

11. A method for compressing digital data representative of images, said method comprising the steps of:

generating an input stream of digital data representative of an original image, exhaustively and non-linearly predicting the value of a current picture element represented by said digital data, based on the value of at least one previous picture element represented by said digital data, comparing the output value of the predicted current picture element with the actual value of the current picture element, thereby to provide a stream of digital data representing a new image correlated to errors produced by the output value of the predicted current picture element, and encoding the run lengths of errors to obtain an encoded new error correlated image, said encoding step using a variable word length, which is a multiple of subwords of length $L$ whose $2^L$ possible states are divided into two mutually-exclusive, unequal groups such that $L = \log_2 (p + n)$ bits, where:

$p$ = the number of states in the lowest order subwords $n$ = the number of states in successive higher and highest order subwords.

12. The method of claim 11, including the additional step of storing said predicted and run-length encoded data for selective reproduction of said images.

13. A system for compressing a stream of digital data representing an original image, said system comprising:

an input stream of digital data representing said original image;

an exhaustive, non-linear causal predictor stage having its input connected to said stream for predicting the value of a current picture element represented by said digital data, based on the value of at least one previous picture element represented by said digital data, said predictor stage including:

means for comparing the output value of said predictor with the actual value of the current picture element, thereby to provide a stream of digital data representing a new image correlated to errors produced by said predictor;

and a run length encoder stage connected to the output of said predictor stage for encoding the new error correlated image, said run length encoder stage using a variable word length, which is a multiple of subwords of length $L$ whose $2^L$ possible stages are divided into two mutually-exclusive, unequal groups such that $L = \log_2 (p + n)$ bits, where $p$ = the number of states in the lowest order subwords $n$ = the number of states in successive higher and highest order subwords;

and a buffer for receiving and storing the digital data after said data has been processed by said predictor and said run-length encoder stages.

14. The system of claim 13 wherein subword the length unit for the $(p, n)$ number system is any integer value.

15. A method of compressing digital data representative of images, comprising the steps of:

providing a stream of digital data representing an image, encoding the run lengths of said stream of data, by using a variable word length, which is a multiple of subwords of length $L$ whose $2^L$ possible states are divided into two mutually-exclusive, unequal groups such that $L = \log_2 (p + n)$ $p$ = the number of states in the lowest order subwords $n$ = the number of states in successive higher and highest order subwords, and storing said run-length encoded data for selective reproduction of said images.

16. The method of claim 15 wherein:

said encoding step specifically comprises using a variable word length, which is a multiple of said subwords of length L, wherein said length $L$ comprises 4 binary bits, whose $2^L$ possible states are divided into two mutually-exclusive, unequal groups such that $L = \log_2(p+n)$ bits, where:

$p = 10$, which is the number of states in the lowest order subwords and $n = 6$, which is the number of states in successive higher and highest order subwords.

17. The method of claim 16 further comprising the additional steps of:

specifically encoding special events from said data stream with predetermined unused subword combinations from said encoding step, said special events including "end of scan line," "blank scan line" and "end of page."

18. The method of claim 17 wherein:

said specially encoding step additionally comprises encoding another special event from said data stream with another predetermined unused subword combination from said encoding step to denote "totally errorless scan line/jump to to end of scan line" in place of the last run code in a line.

* * * * *